United States Patent [19]
Frantz et al.

[11] Patent Number: 4,513,604
[45] Date of Patent: Apr. 30, 1985

[54] METHOD AND APPARATUS FOR INDICATING LEAKAGE IN COMPRESSED AIR LINE

[76] Inventors: Virgil L. Frantz, P.O. Box 1099; Robert W. Bowles, 650 Boon St., both of Salem, Va. 24153

[21] Appl. No.: 526,008

[22] Filed: Aug. 24, 1983

[51] Int. Cl.³ ............................................. G01M 3/28
[52] U.S. Cl. ........................................ 73/39; 116/291
[58] Field of Search ..................... 73/39; 116/291, 293, 116/296, 305, 306, 312, 315, 323, 324

[56] References Cited
U.S. PATENT DOCUMENTS

| | | | |
|---|---|---|---|
| 2,674,121 | 4/1954 | Gorman | 73/39 |
| 3,045,638 | 7/1962 | Davio | 116/306 |
| 3,175,531 | 3/1965 | Du Bois | 116/312 |
| 3,203,391 | 8/1965 | Corwin | 116/324 X |
| 3,531,981 | 10/1970 | Pommer | 73/39 |

Primary Examiner—Anthony V. Ciarlante
Assistant Examiner—Joseph W. Roskos
Attorney, Agent, or Firm—Wilmer Mechlin

[57] ABSTRACT

Method and apparatus for indicating on a pressure differential gauge whether air leakage in a compressed air line is within a predetermined acceptable level, the gauge has pressure-responsive and manually shiftable pointers and is connectable in the air line across a first restriction in the line for indicating by the pressure-responsive pointer pressure differentials across the first restriction, and a second restriction temporarily insertable in the line downstream of the first restriction for passing air at a rate equal to the permissible air leakage from the line, and discharging air through the second restriction and indicating by the manually shiftable pointer the position of the pressure-responsive pointer during such discharge, the manually shiftable pointer after removal of the temporary restriction indicating by the relative position of the pressure-responsive pointer on charging of the line whether leakage therefrom is within acceptable limits.

7 Claims, 9 Drawing Figures

METHOD AND APPARATUS FOR INDICATING LEAKAGE IN COMPRESSED AIR LINE

BACKGROUND OF THE INVENTION

As in Frantz U.S. Pat. No. 3,603,154, issued Sept. 7, 1971 and Taylor U.S. Pat. No. 4,016,760, issued Apr. 12, 1977, differential flow meters, such as the Bourdon tube type of the Taylor patent, are widely used, with or without calibration, for indicating variations in the flow rate of compressed air or other gas through a line by measuring variations in the pressure differential or drop across a restricted orifice in the line. Since the flow rate varies as the square root of the pressure differential, for the flow rate to be directly readable on the flowmeter's scale, either the drive mechanism for an indicator pointer or the scale itself must be adapted to extract the square root of the pressure differentials. However, a uniform linear scale, such as illustrated in the indicator of the Taylor patent, giving direct readings of pressure differentials, usually will suffice as indicating variations in the flow rate.

In railway train consists and particularly in the now usual long freight train consists of a hundred or more cars having air brake lines connected in series to the compressed air system of the one or more locomotives, some air leakage from the consist's brake line is almost inevitable. The problem this poses is that if the consist's brake line leakage exceeds a predetermined maximum, its air brakes will not operate properly and under A.A.R. (Association of American Railroads) rules, the train cannot be moved before the air leakage has been reduced to an acceptable level. It is with a method and apparatus for indicating in a locomotive whether leakage of compressed air from the air brake line is within acceptable limits that the present invention is primarily concerned.

SUMMARY OF THE INVENTION

An object of the present invention is to provide an improved method for indicating in the vicinity of the leading end of a compressed gas system whether the total gas leakage from the system is within predetermined permissible limits.

Another object of the invention is to provide an improved method using a differential flowmeter for determining at a locomotive of a train consist whether leakage of compressed air from the consist's air brake line is within permissible limits before the train gets underway.

An additional object of the invention is to provide an improved differential flowmeter presettable for visually indicating in a locomotive of a freight train consist whether in terms of compressed air leakage from the consist's air brake system, it is safe for the consist to get underway.

A further object of the invention is to provide an improved differential flowmeter connected to a compressed gas line by taps upstream and downstream of a restriction therein and having a pointer movable in response to pressure differentials across the restriction, in which the pressure differential imposed on the flowmeter during a measurement is fine-tunable by increasing under valve control the pressure downstream of the orifice by passing part of the air from the upstream tap to the downstream tap through a bypass between the taps.

Another object of the invention is to provide an improved differential flowmeter having a pointer responsive to pressure differentials across a restriction in the line, and an adjustable pointer manually shiftable to and settable in a position assumed by the pressure-responsive pointer in response to controlled discharge of air from the line beyond the restriction at a predetermined flow rate and pressure for thereafter fixing the upper limit of the range of movement of the pressure-responsive pointer within which the rate of leakage of air from the air brake line of a train consist in which the locomotive is coupled is acceptable, the flowmeter being so constructed and arranged that the adjustable pointer, once set, is protected against accidental displacement.

Yet another object of the invention is to provide an improved method of indicating by a differential flowmeter in a locomotive of a train consist whether loss of pressure in the consist's air brake line due to leakage is so limited as not to interfere with operation of the brakes, the method involving connecting the flowmeter to an air line of the locomotive's air brake system across a restriction in the line, temporarily inserting in an end of the line of the locomotive downstream of the first restriction a second restriction of a size to pass air under the pressure available in the locomotive's compressed air system at a rate equal to the permissible air leakage from the consist's brake line, discharging air under the available pressure to atmosphere through the second restriction, and positioning a manually shiftable pointer/indicator on a scale on the dial of the flowmeter at the point reached by a pressure-responsive pointer of the flowmeter during the discharge through the second orifice for thereby visually indicating on the flowmeter the maximum pressure drop permissible in the consist's air brake line without interfering with operation of the brakes.

The foregoing and other objects and advantages of the invention will appear hereinafter in the detailed description, be particularly pointed out in the appended claims and be illustrated in the accompanying drawings, in which:

FIGURE DESCRIPTION

DETAILED DESCRIPTION

Figure 1:
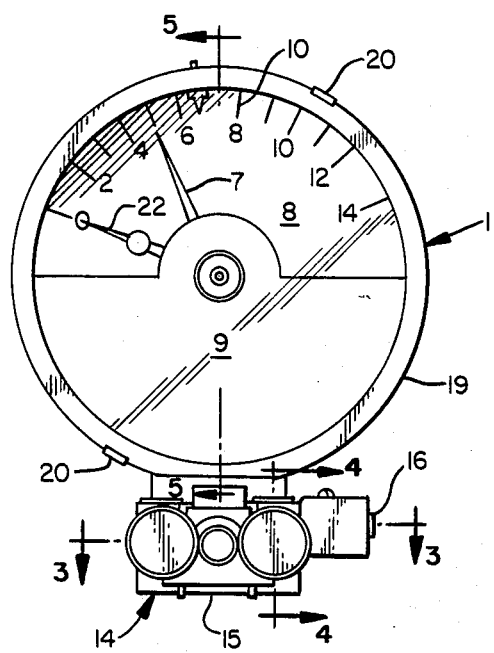
FIG. 1 is a front elevational view of a preferred embodiment of the air flow indicator of the present invention.
Figure 2:
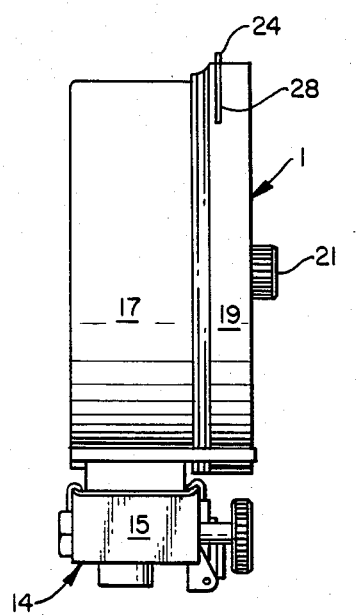
FIG. 2 is a side elevational view of the indicator of FIG. 1.
Figure 3:
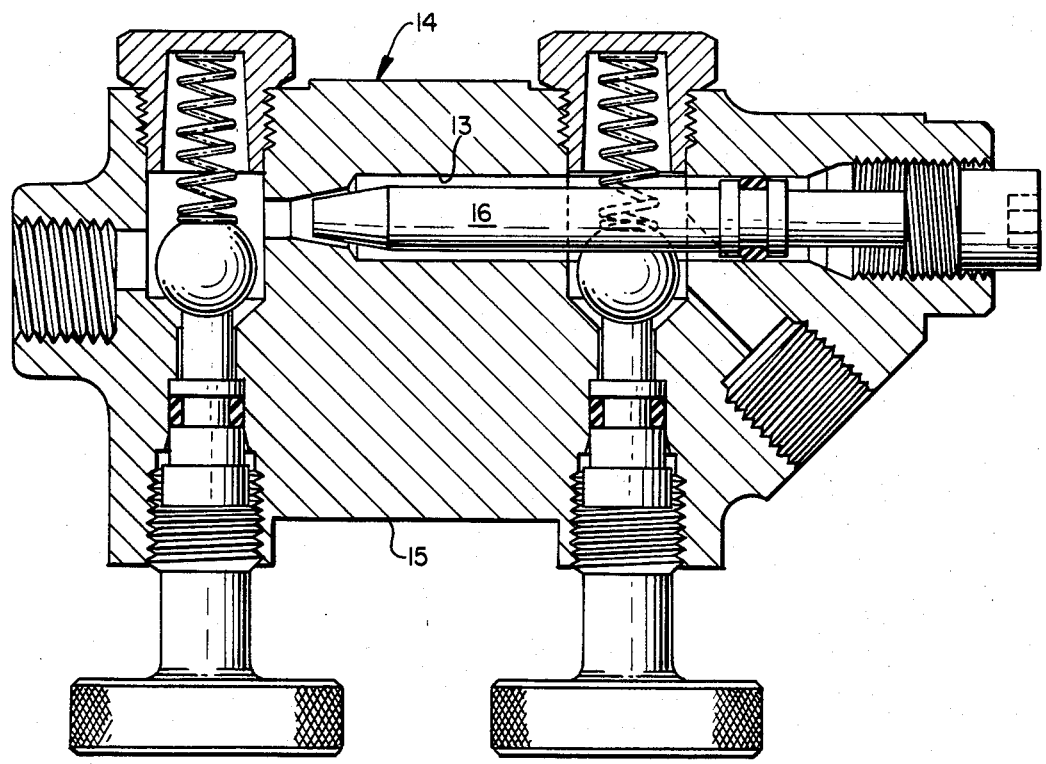
FIG. 3 is a horizontal sectional view on a much enlarged scale taken along lines 3—3 of FIG. 1.
Figure 4:
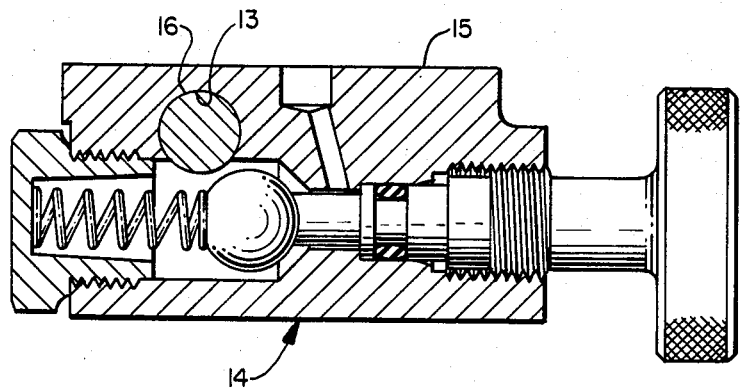
FIG. 4 is a fragmentary vertical sectional view on the scale of FIG. 3, taken along lines 4—4 of FIG. 1.
Figure 5:
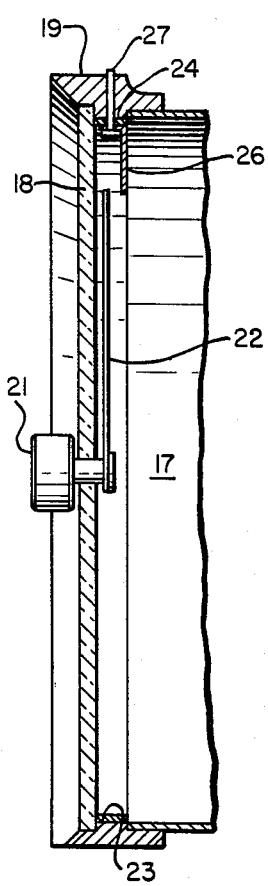
FIG. 5 is a fragmentary vertical sectional view on an enlarged scale taken along lines 5—5 of FIG. 1.
Figure 6:
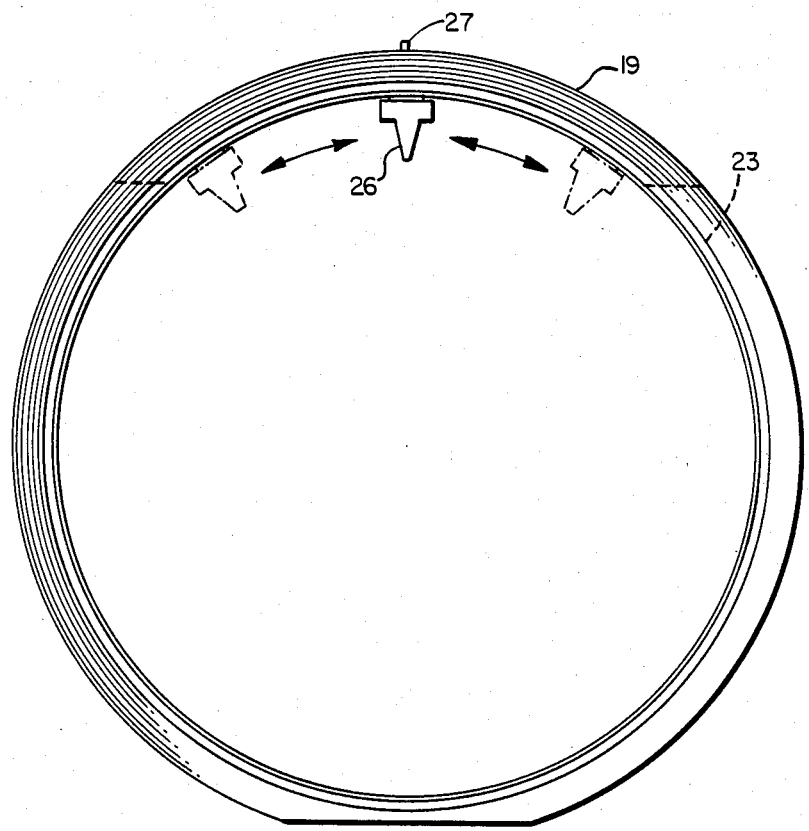
FIG. 6 is a fragmentary front elevational view of the pointer removed from the remaining structure of FIG. 5.
Figure 7:
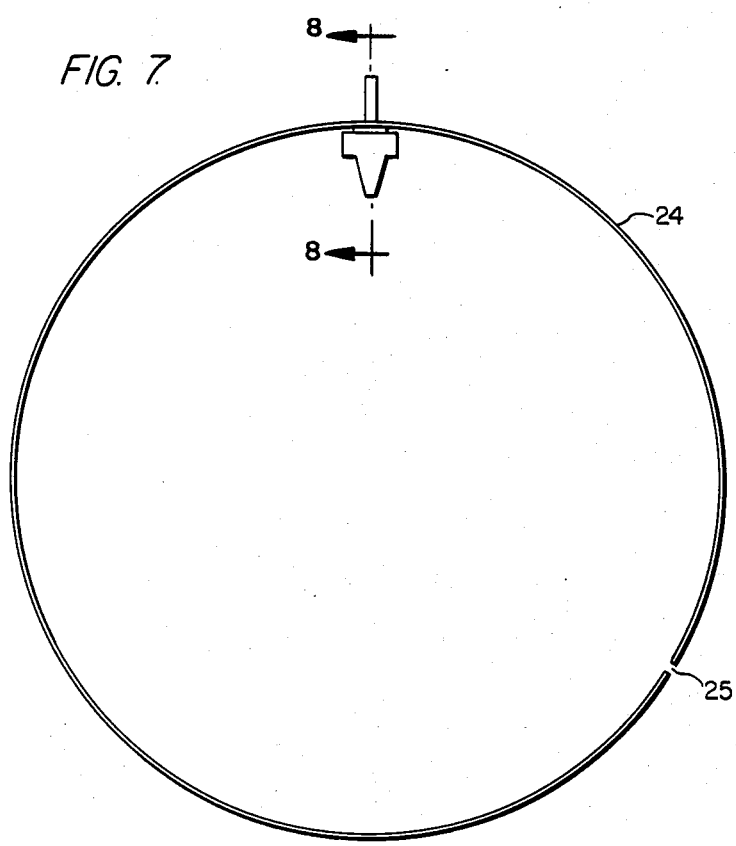
FIG. 7 is a front elevational view of the pointer of FIG. 6 removed from the rim.
Figure 8:
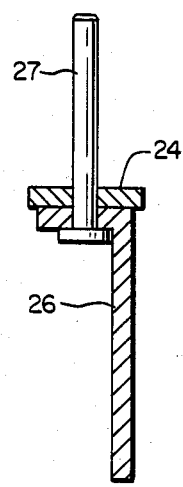
FIG. 8 is a fragmentary vertical sectional view on a further enlarged scale taken along lines 8—8 of FIG. 7.
Figure 9:
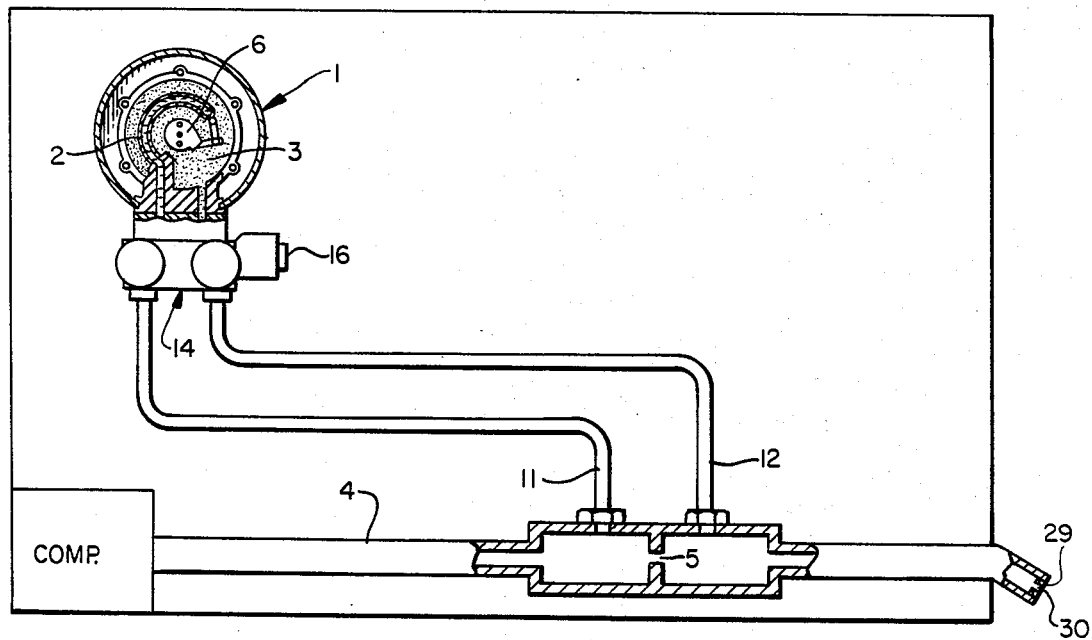
FIG. 9 is a view, partly schematic, showing the flowmeter and associated apparatus used in conducting the method of the present invention.

Referring now in detail to the drawings in which like reference characters designate like parts, the method and apparatus of the present invention, while adaptable for use in other compressed gas systems for indicating whether gas leakage in a system is within permissible limits, is particularly designed for use in a compressed air system of a freight train consist for visually indicating in a locomotive after a consist has been made up whether air leakage from the train's air brake line is insufficient to interfere with operation of the train's air brakes and thus within permissible limits. As exemplary of the invention, it therefore will be as applied to a freight train that the method and apparatus of the present invention will be described.

As does that of Taylor U.S. Pat. No. 4,016,760, the differential flowmeter or air flow indicator of the present invention, designated as 1, is basically a Bourdon tube type pressure gauge containing a Bourdon tube 2 in a sealed pressure chamber 3 connected to compressed air or other fluid line 4 downstream of a restriction or restricted orifice 5 therein. Connected internally to the line 4 upstream of the restriction 5, the Bourdon tube 2, by being subjected internally to the higher pressure above and externally to the lower pressure below the restriction 5, bends to a degree corresponding to the pressure differential across the restricted orifice and, through a drive train or mechanism 6 connected to its free end, translates the tube's bending or flexing into rotary movement of a pressure-responsive pointer 7 conveniently magnetically connected to the drive train.

Again, as in the Taylor patent, the flowmeter 1 has as a face a dial 8, a lower part of which is masked, as by a masking card 9, and the upper part has on it a scale 10. Since the flow rate of fluid through the line 4 varies as the square root of the pressure differential, the scale 10, for direct reading of flow rates, may be calibrated to extract the square roots of pressure differentials indicated by the pointer 7. However, the concern of the present invention is not with the rate of flow but variations in that rate and the flow rate varies directly with variations in the pressure differentials. The illustrated uniform linear scale 10 giving direct readings of pressure differentials therefore will serve to indicate variations in the flow rate through the line 4.

With the Bourdon tube 2 connected to the air line 4 upstream of or above the restricted orifice 5 by an upstream tap or piping 11 and the pressure chamber 3 connected to the line below or downstream of the orifice by a downstream tap or piping 12, the pressure differential readable directly on the scale 10 is the pressure differential or drop across the orifice. In the exemplary embodiment in which the objective is to determine whether the leakage in the air brake line of a freight train consist is within acceptable limits, the air line 4 will be in the air brake system of a locomotive and suitably may be the connection between a main reservoir (not shown) supplying compressed air and a brake valve (not shown) and the orifice or restriction 5 an A-19 adaptor or 19/64 orifice plate approved by the A.A.R. With such an orifice, which in the 19/64 plate version is a 0.297 in. (0.754 cm.) diameter, square-edged circular orifice in a flat orifice plate and the reservoir or other source supplying compressed air at a pressure of 120–130 psi (8.4–9.1 kg./sq.cm.) or 130–140 psi (9.1–9.8 kg./sq.cm.) customary respectively in the United States and in Canada for air brake operation, the pressure responsive pointers 7 of identical differential flowmeters or gauges under the same source pressure should give approximately the same reading.

The above pressure differential reading preferably will be in the central or middle part or section of the scale 10 so that the pointer will be contained within the scale during operation of the flowmeter. To obtain such a reading despite inexactness of the orifice 5, as due to manufacturing tolerances or deposit of solids on the upstream side of the orifice, provision is made for fine tuning or adjusting the position of the pointer by reducing the pressure differential between the upstream tap 11 and the downstream tap 12 by adding to the flow of fluid through the orifice 5, flow through a variable or adjustable bypass 13 between or connecting the taps. For such fine tuning, the gauge 1 preferably is mounted on a quick release mounting bracket 14 such as disclosed in Frantz U.S. Pat. No. 3,603,154, except for having in its body 15 the bypass 13 between the taps or leads 11 and 12 from the line 4 and conveniently an Allen wrench-adjustable needle valve 16 projecting into the bypass for regulating or adjusting the effective pressure differential or the gauge.

The improved flowmeter 1 also resembles that of the Taylor patent in containing the Bourdon tube 2, pressure chamber 3 and drive train 6 in a case, casing or housing 17 which is closed or covered at the front by a lens 18 mounted in a rim or retainer ring 19 clipped or otherwise removably secured to the case, conveniently by a double-armed spring clip 20. Preferably both magnifying and made of substantially unbreakable plastic, such as "LEXAN", the lens 18 mounts on its back the masking card 9 and on its front at the center a knob 21 for manually turning relative to the scale 10 a concentric reference pointer 22 contained in the space between the lens and the dial 8 outwardly of the pressure-responsive pointer 7. By contrast with that of the Taylor flowmeter, the rim 19 slidably and rotatably mounts in a concentric cylindrical track or seat 23 on its inside between the case 17 and lens 18 a radially expandable annular or circular spring or resilient band or strip 24 suitably made of resilient plastic, such as "TEFLON". Initially of somewhat larger diameter than the track 23, the band 24 has in its circumference a break or gap 25 of a width such that the band can be compressed or squeezed into a tight fit in the track and thereafter frictionally resist turning or rotation relative to the track. Suitably more or less diametrically opposite the split 25, the band 24 has bonded or otherwise fixed to it a radially instanding pointer 26 and coradial outstanding positioning or adjusting pin 27, the latter in operative position riding in and projecting outwardly through a circumferential slot 28 spanning an arc suitably on the order of about 70° in the midportion of the upper part of the rim or, in terms of the numerals of the scale 10, extending about 5 to about 9.

While, as previously pointed out, the air pressure for operating brakes is somewhat lower on American than on Canadian railroads, the railroads of both countries under regulations of the A.A.R. are uniform in limiting the permissible leakage of air from the brake line of a freight train consist at the customary pressures to 60 cfm. For indicating this maximum permissible leakage at the locomotive in accordance with the present invention, there is temporarily connected or fitted to the rear end of the air brake line in the locomotive a test orifice plate 29 having an orifice 30 of a diameter to discharge, pass or exhaust compressed air at the authorized pressure to the atmosphere at the rate of 60 cfm (28.32 liters/sec.). For example, for an applied pressure of 130 psi (9.1 kg./sq.cm.) the diameter of the test orifice for the required 60 cfm flow rate, would be 0.243 in. (0.617 cm.).

On charging of the locomotive line 4 with the test orifice 30 in place at the rear end of the line, the pressure differential measured by the flowmeter or gauge 1 will still be the pressure drop across the orifice 5, with the difference that the downstream pressure will be reduced and the differential increased by the escape or discharge of compressed air to atmosphere through the test orifice. The pressure-responsive pointer 7 will swing along the scale 10 to the point determined by the pressure differential to which it is subjected and, by manually moving the pointer 26 by the positioning pin 27 to the same position along the scale, that pointer after removal of the test orifice and connection of the locomotive air brake line in the line of a freight train consist, on charging of the line with compressed air at the authorized pressure, will automatically indicate by the position of the pressure-responsive pointer or needle 7 to the left or right of the then stationary or fixed band-mounted pointer 26, whether the total air leakage from the line is respectively within or beyond the permissible limit. To prevent accidental displacement of the indicator pointer 26, the positioning pin 27 preferably is substantially contained in the slot 28 in the rim 19 and projects outwardly therefrom only sufficiently to be engaged by a finger. Although not essential in predetermining the maximum permissible leakage from the line 4, the other, knob-adjustable reference pointer 22 does provide a convenient way for indicating the position of the pressure-responsive pointer on the previous charging of the brake line.

From the above detailed description it will be apparent that there has been provided an improved differential flowmeter and method of using it for indicating in a locomotive or otherwise at or adjacent the head or leading end of a compressed gas line whether, when charged with compressed air at the prescribed pressure, leakage of air from the line is within permissible limits. It should be understood that the described and disclosed embodiment is merely exemplary of the invention and that all modifications are intended to be included that do not depart from the spirit of the invention and the scope of the appended claims.

Having described my invention, I claim:

1. A differential flowmeter connectable to a compressed gas line upstream and downstream of a restriction in said line, said flowmeter comprising a casing, a dial on said casing, a pointer pivotally mounted on said dial and responsive to pressure differentials across said restriction for indicating said differentials on a scale on said dial, a rim attached to said casing forwardly of said dial, a concentric cylindrical track on an inside of said rim, a circumferentially gapped radially expandable resilient band compressed into and rotatable in said track relative to said rim, and indicator/pointer fixed to said band for swinging therewith along said scale, and a positioning pin fixed to and projecting radially from said band through and substantially contained against accidental actuation in a circumferential slot in said rim for manually shifting said indicator/pointer along said scale against yieldable resistance between said band and track.

2. A differential flowmeter according to claim 1, wherein the connections to the compressed gas line upstream and downstream of the restriction therein are respectively upstream and downstream taps, a bypass connecting said taps between the flowmeter and the line, and valve means for regulating flow between said taps through said bypass and thereby the pressure differential across said restriction and indicated by the pressure-responsive pointer on said dial.

3. A differential flowmeter according to claim 2, including a mounting bracket between the flowmeter and line releasably mounting the flowmeter, and wherein the bypass and valve means for regulating flow therethrough are in said mounting bracket.

4. A method of using a flowmeter according to claim 3 for indicating adjacent a leading end of a compressed gas line whether leakage from the line is within or beyond a predetermined permissible maximum, comprising connecting the flowmeter to the line upstream and downstream of the restriction, charging the line, regulating by the valve means the flow through the bypass for fine-tuning the pressure differential imposed on the flowmeter to position the pressure responsive pointer in a mid-portion of the scale or dial, inserting in said line downstream of said first restriction a second restriction of a size to pass gas under the pressure applied to said line at a flow rate predetermined by the maximum permissible rate of leakage from said line, charging said line with compressed gas while discharging said gas at a controlled rate to atmosphere through said second restriction and consequently indicating on the dial by the pressure-responsive pointer the pressure differential across said first restriction during said discharge, and manually shifting the band-mounted indicator/pointer to the position of the pressure-responsive pointer on the dial during said discharge, said manually shiftable pointer on removal of said second restriction and subsequent recharging of said line indicating by the position of the pressure responsive-pointer relative thereto whether leakage of gas from the line downstream of the first restriction is within or beyond permissible limits.

5. A method using a flowmeter according to claim 1 for indicating adjacent a leading end of a compressed gas line whether leakage from the line is within or beyond a predetermined permissible maximum, comprising connecting said flowmeter to said line upstream and downstream of a first restriction therein, inserting in said line downstream of said first restriction a second restriction of a size to pass gas under the pressure applied to said line at a flow rate predetermined by the maximum permissible rate of leakage from said line, charging said line with compressed gas while discharging said gas at a controlled rate to atmosphere through said second restriction and consequently indicating on the dial by the pressure-responsive pointer the pressure differential across said first restriction during said discharge, and manually shifting the band-mounted indicator/pointer to the position of the pressure-responsive pointer on the dial during said discharge, said manually shiftable pointer on removal of said second restriction and subsequent recharging of said line indicating by the position of the pressure-responsive pointer relative thereto whether leakage of gas from the line downstream of the first restriction is within or beyond permissible limits.

6. A method for indicating whether leakage from a compressed gas line is within or beyond a predetermined permissible maximum, comprising connection to said line across a first restriction therein a differential flowmeter having a pointer shiftable along a scale on a dial thereof in response to differential pressures thereon and an indicator manually shiftable along said scale, inserting in said line downstream of said first restriction a second restriction of a size to pass gas under the pressure normally applied to said line at a flow rate substantially equal to the permissible rate of leakage from said line, charging said line with compressed gas while discharging said gas at a controlled rate to atmosphere through said second restriction and consequently indicating on the dial by the pressure-responsive pointer the pressure differential across said first restriction during said discharge, and manually shifting said indicator to the position of the pressure-responsive pointer on said scale, said indicator on removal of said second restriction and recharging of said line indicating by the position relative thereto on said scale of the pressure-responsive pointer whether leakage of gas from the line downstream of the first restriction is within or beyond permissible limits.

7. A method according to claim 6 wherein the compressed gas line is an air brake line of a railway car consist, the first and second restrictions and flowmeter are in a locomotive couplable to said consist, and said locomotive is coupled to said consist before recharging of the air brake line thereto.

* * * * *